US012626088B2

(12) United States Patent
Lee et al.

(10) Patent No.: US 12,626,088 B2
(45) Date of Patent: May 12, 2026

(54) NEURAL NETWORK APPARATUS, NEURAL NETWORK PROCESSOR, AND METHOD OF OPERATING NEURAL NETWORK PROCESSOR

(71) Applicants:Samsung Electronics Co., Ltd., Suwon-si (KR); Seoul National University R&DB Foundation, Seoul (KR)

(72) Inventors: Sehwan Lee, Suwon-si (KR); Dongyoung Kim, Incheon (KR); Sungjoo Yoo, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 1598 days.

(21) Appl. No.: 15/870,767

(22) Filed: Jan. 12, 2018

(65) Prior Publication Data

US 2018/0253636 A1 Sep. 6, 2018

(30) Foreign Application Priority Data

Mar. 6, 2017 (KR) ........................ 10-2017-0028545
Mar. 30, 2017 (KR) ........................ 10-2017-0041160

(51) Int. Cl.
*G06N 3/02* (2006.01)
*G06N 3/045* (2023.01)
*G06N 3/063* (2023.01)

(52) U.S. Cl.
CPC ............... *G06N 3/02* (2013.01); *G06N 3/045* (2023.01); *G06N 3/063* (2013.01)

(58) Field of Classification Search
CPC ......... G06N 3/02; G06N 3/0454; G06N 3/063
See application file for complete search history.

(56) References Cited

U.S. PATENT DOCUMENTS

2011/0119467 A1* 5/2011 Cadambi ................ G06N 20/10
712/27
2016/0225378 A1 8/2016 Grancharov et al.
(Continued)

FOREIGN PATENT DOCUMENTS

| JP | 2016-153984 A | 8/2016 |
|----|----|----|
| KR | 10-2016-0142791 A | 12/2016 |
| KR | 10-2016-0143505 A | 12/2016 |

OTHER PUBLICATIONS

Song Han et al, "EIE: Efficient Inference Engine on Compressed Deep Neural Network", Jun. 18, 2016 (Year: 2016).*
(Continued)

*Primary Examiner* — Michael H Hoang
(74) *Attorney, Agent, or Firm* — NSIP Law

(57) ABSTRACT

A neural network processor and method include a fetch controller configured to receive input feature information, indicating whether each of a plurality of input features of an input feature map includes a non-zero value, and weight information, indicating whether each of a plurality of weights of a weight map includes a non-zero value, and configured to determine input features and weights to be convoluted, from among the plurality of input features and the plurality of weights, based on the input feature information and the weight information. The neural network processor and method also include a data arithmetic circuit configured to convolute the determined weights and input features to generate an output feature map.

14 Claims, 7 Drawing Sheets

(56) References Cited

U.S. PATENT DOCUMENTS

| | | | | |
|---|---|---|---|---|
| 2016/0328643 | A1* | 11/2016 | Liu | G06N 3/0454 |
| 2016/0358068 | A1* | 12/2016 | Brothers | G06N 3/082 |
| 2016/0358069 | A1* | 12/2016 | Brothers | G06F 7/764 |
| 2017/0046613 | A1 | 2/2017 | Paluri et al. | |
| 2017/0193361 | A1* | 7/2017 | Chilimbi | G06N 3/084 |
| 2018/0046900 | A1* | 2/2018 | Dally | G06F 9/30018 |
| 2018/0218518 | A1* | 8/2018 | Yan | G06T 9/002 |

OTHER PUBLICATIONS

Chen, Wenlin, et al. "Compressing convolutional neural networks." arXiv preprint arXiv:1506.04449 (2015). https://arxiv.org/abs/1506.04449 (Year: 2015).*

Liu, Baoyuan, et al. "Sparse convolutional neural networks." Proceedings of the IEEE conference on computer vision and pattern recognition. 2015. https://openaccess.thecvf.com/content_cvpr_2015/papers/Liu_Sparse_Convolutional_Neural_2015_CVPR_paper.pdf (Year: 2015).*

Han, Song, Huizi Mao, and William J. Dally. "Deep compression: Compressing deep neural networks with pruning, trained quantization and huffman coding." arXiv preprint arXiv:1510.00149 (2015). https://arxiv.org/abs/1510.00149 (Year: 2015).*

Chen, Yu-Hsin, et al. "Eyeriss: An energy-efficient reconfigurable accelerator for deep convolutional neural networks." IEEE journal of solid-state circuits 52.1 (2016): 127-138. (Year: 2016).*

Wen, Wei, et al. "Learning structured sparsity in deep neural networks." Advances in neural information processing systems 29 (2016). https://proceedings.neurips.cc/paper/2016/hash/41bfd20a38bb1b0bec75acf0845530a7-Abstract.html (Year: 2016).*

Wang, Ying, Huawei Li, and Xiaowei Li. "Re-architecting the on-chip memory sub-system of machine-learning accelerator for embedded devices." 2016 IEEE/ACM International Conference on Computer-Aided Design (ICCAD). IEEE, 2016. https://ieeexplore.ieee.org/stamp/stamp.jsp?tp=&arnumber=7827590 (Year: 2016).*

Nagasaka, Yusuke, Akira Nukada, and Satoshi Matsuoka. "Adaptive multi-level blocking optimization for sparse matrix vector multiplication on GPU." Procedia Computer Science 80 (2016): 131-142. https://www.sciencedirect.com/science/article/pii/S187705091630655X (Year: 2016).*

Liu, Weifeng, and Brian Vinter. "An efficient GPU general sparse matrix-matrix multiplication for irregular data." 2014 IEEE 28th International Parallel and Distributed Processing Symposium. IEEE, 2014. https://ieeexplore.ieee.org/stamp/stamp.jsp?tp=&arnumber=6877271 (Year: 2014).*

Liu, Baoyuan, et al. "Sparse convolutional neural networks." Proceedings of the IEEE conference on computer vision and pattern recognition. 2015. https://openaccess.thecvf.com/content_cvpr_2015/html/Liu_Sparse_Convolutional_Neural_2015_CVPR_paper.html (Year: 2015).*

Chen, Yunji, et al., "DaDianNao: A Machine-Learning Supercomputer." *2014 47th Annual IEEE/ACM International Symposium on Microarchitecture*, Dec. 13, 2014 (pp. 609-622).

Han, Song, et al., "EIE: Efficient Inference Engine on Compressed Deep Neural Network", *2016 ACM/IEEE 43rd Annual International Symposium on Computer Architecture (ISCA)*, Feb. 4, 2016 (pp. 243-254).

Albericio, Jorge, et al., "Cnvlutin: Ineffectual-Neuron-Free Deep Neural Network Computing", 2016 *ACM/IEEE 43rd Annual International Symposium on Computer Architecture (ISCA)*, vol. 44. No. 3, 2016, (pp. 1-13).

Chen, Yu-Hsin, et al., "Eyeriss: An Energy-Efficient Reconfigurable Accelerator for Deep Convolutional Neural Networks", *IEEE Journal of Solid-State Circuits*, vol. 52, Issue 1, Jan. 2017 (pp. 127-138).

* cited by examiner

1000

NEURAL NETWORK APPARATUS, NEURAL NETWORK PROCESSOR, AND METHOD OF OPERATING NEURAL NETWORK PROCESSOR

CROSS-REFERENCE TO RELATED APPLICATIONS

This application claims the benefits of Korean Patent Application No. 10-2017-0028545, filed on Mar. 6, 2017 and Korean Patent Application No. 10-2017-0041160, filed on Mar. 30, 2017 in the Korean Intellectual Property Office, the disclosures of which are incorporated herein in their entireties by reference.

BACKGROUND

1. Field

The following description relates to a neural network apparatus, a neural network processor, and a method of operating the neural network processor.

2. Description of Related Art

A neural network refers to a computational architecture that models a biological brain. Recently, with the development of neural network technology, various kinds of electronic systems have been actively studied to analyze input data and extract valid information using a neural network apparatus.

A neural network apparatus performs multiple operations to process complex input data. In order for the neural network apparatus to analyze high-quality input, in real time, and extract information, an apparatus and method capable of efficiently processing neural network operations are needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are a neural network apparatus, a neural network processor, and a method of operating the neural network processor.

In accordance with an embodiment, there may be provided a neural network processor, including: a fetch controller configured to receive input feature information, indicating whether each of a plurality of input features of an input feature map includes a non-zero value, and weight information, indicating whether each of a plurality of weights of a weight map includes a non-zero value, and configured to determine input features and weights to be convoluted, from among the plurality of input features and the plurality of weights, based on the input feature information and the weight information; and a data arithmetic circuit configured to convolute the determined weights and input features to generate an output feature map.

The data arithmetic circuit may be configured to selectively convolute the determined weights and the input features from among the plurality of the input features and the plurality of weights.

The fetch controller may be configured to detect the input features and the weights may also include non-zero values based on the input feature information and the weight information, and the data arithmetic circuit may be configured to convolute the detected input features and weights.

The input feature information may also include an input feature vector in which a zero-valued feature may be denoted by 0 and a non-zero-valued feature may be denoted by 1, and the weight information may also include a weight vector in which a zero-valued weight may be denoted by 0 and a non-zero-valued weight may be denoted by 1.

In response to the determined input features being a first input feature and a second input feature and the determined weights being a first weight and a second weight, the data arithmetic circuit may be configured to in a current cycle, read the first input feature and the first weight from the input feature map and the weight map to perform the convolution, and in a subsequent cycle, read the second input feature and the second weight from the input feature map and the weight map to perform the convolution.

In accordance with an embodiment, there may be provided a method of operating a neural network processor, the method including: receiving input feature information indicating whether each of a plurality of input features of an input feature map includes a non-zero value and weight information, indicating whether each of a plurality of weights of a weight map includes a non-zero value; determining input features and weights to be convoluted from among the plurality of input features and the plurality of weights based on the input feature information and the weight information; and convoluting on the determined weights and input features to generate an output feature map.

The method may also include: selectively convoluting the determined weights and the input features from among the plurality of the input features and the plurality of weights.

The determining may also include detecting the input features and the weights having non-zero values based on the input feature information and weight information.

The method may also include: performing the convolution on the detected input features and weights.

The input feature information may also include an input feature vector in which a zero-valued feature may be denoted by 0 and a non-zero-valued feature may be denoted by 1, and the weight information may also include a weight vector in which a zero-valued weight may be denoted by 0 and a non-zero-valued weight may be denoted by 1.

In response to the determined input features being a first input feature and a second input feature and the determined weights being a first weight and a second weight, may also include: in a current cycle, reading the first input feature and the first weight from the input feature map and the weight map to perform the convolution; and in a subsequent cycle, reading the second input feature and the second weight from the input feature map and the weight map to perform the convolution.

In accordance with an embodiment, there may be provided a neural network apparatus, including: a processor array may also include neural network processors; a memory configured to store an input feature map and weight maps; and a controller configured to allocate the input feature map and the weight maps to the processor array, and configured to group the weight maps into weight groups and allocate each of the weight groups to the processor array, based on non-zero weight ratios in the weight maps.

The controller may be configured to group the weight maps into the weight groups such that non-zero weight ratios of weight maps comprised in each of the weight groups may be similar between the weight groups.

The controller may be configured to group the neural network processors into processor groups and sequentially allocate each of the plurality of weight groups to the processor groups.

The controller may be configured to provide input feature information that indicates whether each of input features of the input feature map may also include a non-zero value and weight information that indicates whether each of weights of the weight maps may also include a non-zero value, and the processor array may convolute the input feature map and the weight maps based on the input feature information and the weight information to generate an output feature map.

The controller may be configured to divide the input feature map based on a size of the weight maps and allocate the divided input feature maps to the processor array.

The controller may align the weight maps in an ascending order based on ratios of weights having a non-zero value from among the weights of a weight maps.

In accordance with an embodiment, there may be provided a non-transitory computer-readable storage medium storing instructions that, when executed by a processor, cause the processor to perform the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
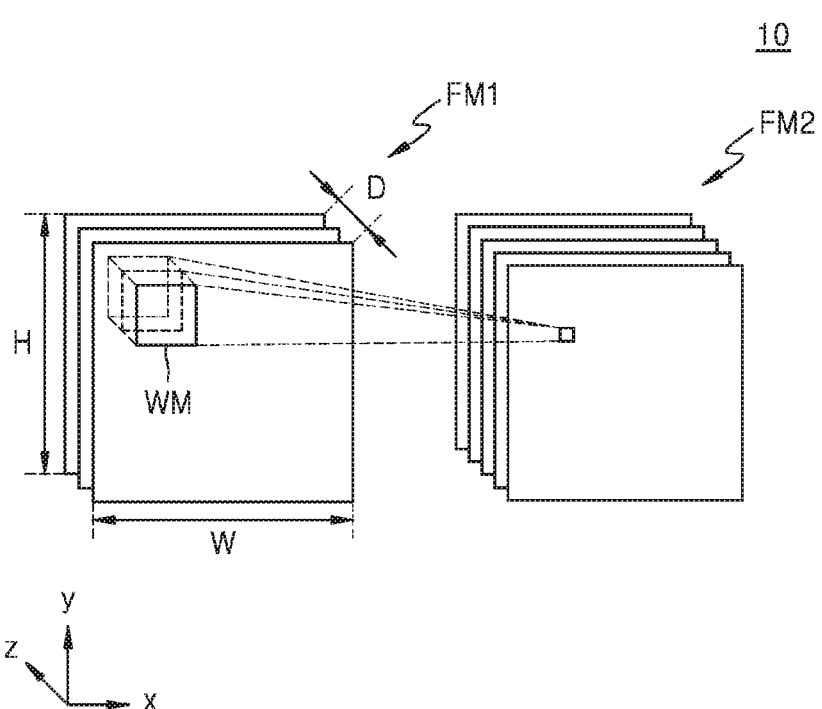
FIG. 1 is a view of a neural network structure, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the apparatus in use or operation in addition to the orientation depicted in the figures. For example, if the apparatus in the figures is turned over, an element described as being "above" or "upper" relative to another element will then be "below" or "lower" relative to the other element. Thus, the term "above" encompasses both the above and below orientations depending on the spatial orientation of the apparatus. The apparatus may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Because the embodiments are related to methods and apparatuses to process a texture called a cube map, a detailed description of matters obvious to those of ordinary skill in the art will not be given herein.

FIG. 1 is a view of a neural network structure, according to an embodiment.

FIG. 1 shows a structure of a convolutional neural network as an example of the neural network structure. Although FIG. 1 shows a convolutional layer 10 of the convolutional neural network, according to an embodiment, the convolutional neural network may further include a pooling layer, a fully connected layer, and other type of layer.

In the convolutional layer 10, a first feature map FM1 is an input feature map and a second feature map FM2 is an output feature map. The feature map refers to data in which various features of input data are expressed. Each of the feature maps FM1 and FM2 may have a 2D or a 3D matrix shape. The feature maps FM1 and FM2 having such a multi-dimensional matrix shape may be referred to as feature tensors. Also, the input feature map may be referred to as activation. The feature maps FM1 and FM2 have a width W (or a column), a height H (or a row), and a depth D, which correspond to x, y, and z coordinate axes, respectively. The depth D may be referred to as a channel number.

In the convolutional layer 10, a convolution operation on the first feature map FM1 and a weight map WM is performed, and as a result the second feature map FM2 is generated. The weight map WM filters the first feature map FM1 and may be referred to as a filter or a kernel. A depth, that is, a number of channels of the weight map WM is the same as a depth or a number of channels of the first feature map FM1. Further, identical channels of the weight map WM and the first feature map FM1 may be convoluted. The weight map WM is shifted to traverse the first feature map FM1 with a sliding window. The amount to be shifted is referred to as a stride length or a stride. During each shift, each weight included in the weight map WM is multiplied and added with all feature values in an overlapping region of the first feature map FM1. One channel of the second feature map FM2 is generated as the first feature map FM1 and the weight map WM are convoluted. Although FIG. 1 shows a single weight map WM, multiple weight maps may be convoluted with the first feature map FM1 to generate multiple channels of the second feature map FM2. In other words, the number of channels of the second feature map FM2 may correspond to the number of weight maps.

In addition, the second feature map FM2 of the convolutional layer 10 is an input feature map of another layer. For example, the second feature map FM2 is an input feature map of a pooling layer.

Figure 2:
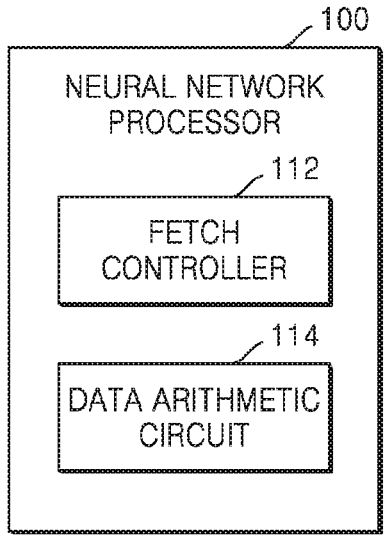
FIG. 2 is a block diagram of a neural network processor, according to an embodiment.

FIG. 2 is a block diagram of a neural network processor 100, according to an embodiment.

The neural network processor 100 includes hardware circuits. For example, the neural network processor 100 may be implemented with integrated circuits. The neural network processor 100 may include, but is not limited to, at least one of a central processing unit (CPU), a multi-core CPU, an array processor, a vector processor, a Digital Signal Processor (DSP), a Field-Programmable Gate Array (FPGA), a Programmable Logic Array (PLA), an Application Specific Integrated-Circuit (ASIC), programmable logic circuitry, a Video Processing Unit (VPU), and a Graphics Processing Unit (GPU).

The neural network processor 100 includes a fetch controller 112 and a data arithmetic circuit 114. Some components are shown in the neural network processor 100 of FIG. 2. Accordingly, additional hardware elements or components may be further included in the neural network processor 100 shown in FIG. 2.

The fetch controller 112 obtains or receives input feature information, which indicates whether each of a plurality of input features of an input feature map has a zero value and weight information, which indicates whether each of a plurality of weights of a weight map has a zero value. According to an embodiment, the fetch controller 112 receives input feature information and weight information from an external source, such as a controller. Furthermore, according to another embodiment, the fetch controller 112 generates input feature information from the input feature map and generates weight information from the weight map.

The fetch controller 112 determines or processes the input features and the weights to be convoluted from among the input features and the weights based on the input feature information and the weight information. According to an embodiment, the fetch controller 112 uses the input feature information and the weight information to detect input features and weights having equal or same non-zero values at locations that correspond to each other from among the input features and the weights, and determines the detected input features and weights as the input features and weights to be convoluted. In one example, if the features or weights are each a bit vector in which zero-valued features or weights are denoted by 0 and non-zero-valued features or weights are denoted by 1, the fetch controller 112 performs or executes an AND operation on input feature information and weight information to determine input features and weights for which a convolution operation is to be performed. According to an embodiment, the fetch controller 112 may include a mathematical arithmetic circuit.

The data arithmetic circuit 114 convolutes input features and weights determined by the fetch controller 112. In other words, the data arithmetic circuit 114 selectively performs or executes a convolution operation on the input features and the weights determined by the fetch controller 112, from among the input features of the input feature map and the weights of the weight map. For instance, the data arithmetic circuit 114 selectively performs convolution operations on input features and weights having equal or same non-zero values at locations that correspond to each other from among the input features and the weights. For example, the data arithmetic circuit 114 performs or executes a convolution operation by multiplying an input feature value by a weight value. According to an embodiment, the data arithmetic circuit 114 includes a mathematical arithmetic circuit. In addition, the data arithmetic circuit 114 executes convolution operations on input features and weights to generate output feature values. Thus, the data arithmetic circuit 114 performs an optional convolution on the input feature map and the weight map based on the input features and the weights having equal or same non-zero values at locations that correspond to each other to generate an output feature map.

According to an embodiment, the neural network processor 100 may further include internal memory. The internal memory may be cache memory of the neural network processor 100. The internal memory may be static random access memory (SRAM). However, the present disclosure is not limited thereto, and the internal memory may be implemented as a simple buffer of the neural network processor 100, cache memory, or another kind of memory of the neural network processor 100. The internal memory stores data generated according to arithmetic operations performed by the data arithmetic circuit 114, such as output feature values, an output feature map, or various types of data generated during the arithmetic operation.

The neural network processor 100 stores or outputs the output feature map generated by the data arithmetic circuit 114 to the internal memory.

Therefore, according to an example, the neural network processor 100 selectively convolutes the input features and the weights having non-zero values, thus, omitting meaningless arithmetic operations that do not affect output features. Thus, the neural network processor 100 effectively reduces the amount of operations and operation time in the convolution for input features and weights.

Figure 3:
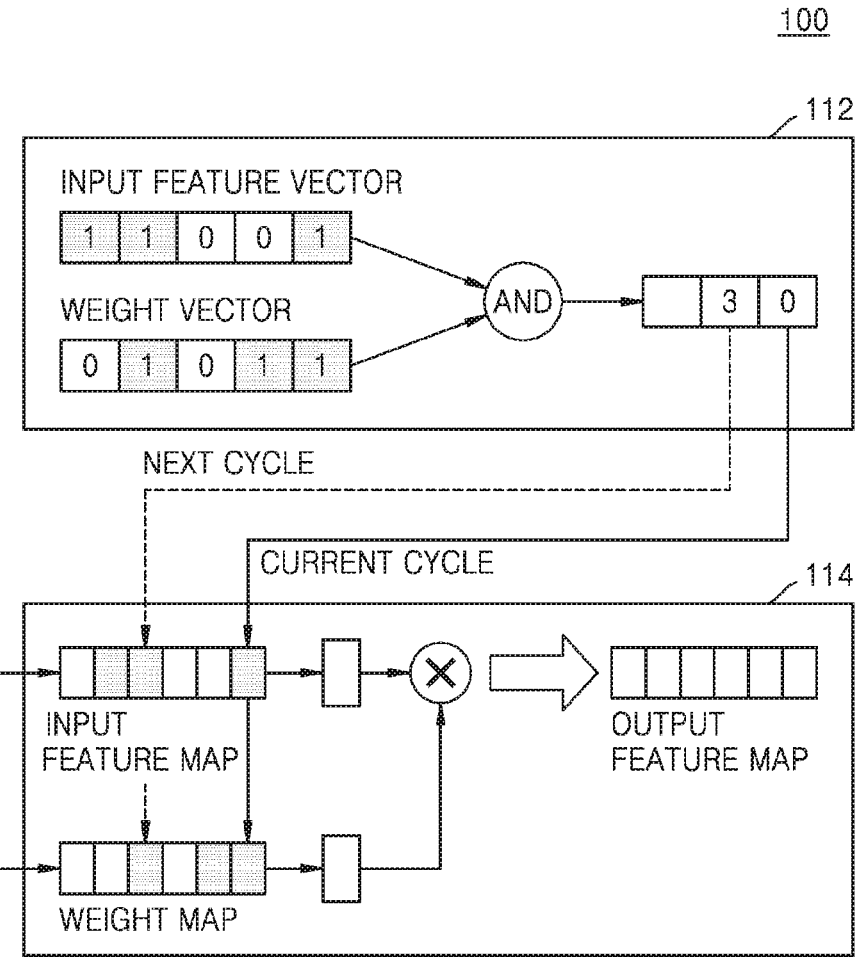
FIG. 3 is a view of an embodiment in which a neural network processor performs selective convolution.

FIG. 3 is a view of an embodiment in which the neural network processor 100 performs selective convolution.

The fetch controller 112 receives an input feature vector that indicates whether each of a plurality of input features of an input feature map has a zero value and a weight vector that indicates whether each of a plurality of weights of a weight map has a zero value. The input feature vector is a bit-vector denoted by 1 when a value of each of the input features is a non-zero value and 0 when a value of each of the input features is a zero value, and the weight vector is also a bit-vector denoted by 1 when a value of each of the weights is a non-zero value and 0 when a value of each of the weights is a zero value. In other words, as shown in FIG. 3, the input feature vector is denoted by 1 because a zeroth input feature, a third input feature, and a fourth input feature of five input features have non-zero values, and the first and second input features are denoted by 0 because they have zero values. In addition, the weight vector is denoted by 1 because the zeroth input feature, the first input feature, and the third input feature of the five input features have non-zero values, and the second and fourth input features are denoted by 0 because they have zero values. Although FIG. 3 shows the input feature map and the input feature vector for the five input features and the weight map and the weight vector for the five weights, the number of input features and weights is not limited thereto. In addition, the input feature map and the weight map shown in FIG. 3 may be an input feature map and a weight map corresponding to a portion of the entire input feature map and the entire weight map.

The fetch controller 112 determines input features and weights to be convoluted through an AND operation on the input feature vector and the weight vector. In more detail, the fetch controller 112 performs the AND operation on the input feature vector and the weight vector to detect input features and weights having equally non-zero values at locations that correspond to each other from among the input features and the weights. As shown in FIG. 3, the fetch controller 112 performs or executes the AND operation on the input feature vector and the weight vector, and detects zeroth and third input features and weights whose result is 1. Thus, the fetch controller 112 determines the detected input features and weights as input features and weights to be convoluted.

The data arithmetic circuit 114 convolutes the input features and the weights determined by the fetch controller 112. The data arithmetic circuit 114 sequentially reads the input features and weights from the input feature map and the weight map to perform the convolution. In other words, the data arithmetic circuit 114 reads an $n^{th}$ input feature of the input feature map and an $n^{th}$ weight of the weight map in a current cycle and performs a convolution. Then, in a next cycle, the data arithmetic circuit 114 performs a convolution by reading an $(n+1)^{th}$ input feature of the input feature map and an $(n+1)^{th}$ weight of the weight map. The data arithmetic circuit 114 performs the convolution on input features and weights determined by the fetch controller 112, and may omit or skip the convolution on input features and weights not determined by the fetch controller 112. As shown in FIG. 3, the data arithmetic circuit 114 convolutes the zeroth input feature and the zeroth weight in the current cycle. In the next cycle, the data arithmetic circuit 114 convolutes the third input feature and the third weight while omitting a convolution on the first and second input features and the first and second weights. In other words, the data arithmetic circuit 114 convolutes input features and weights having non-zero values at locations that correspond to each other from among the input features and the weights.

The data arithmetic circuit 114 convolutes the input features and the weights determined by the fetch controller 112 to generate an output feature map. Furthermore, the data arithmetic circuit 114 generates the output feature map by accumulating convolution results of FIG. 3 on an output feature map that has already been generated through the convolution on the input feature map, different from the weight map.

Figure 4:
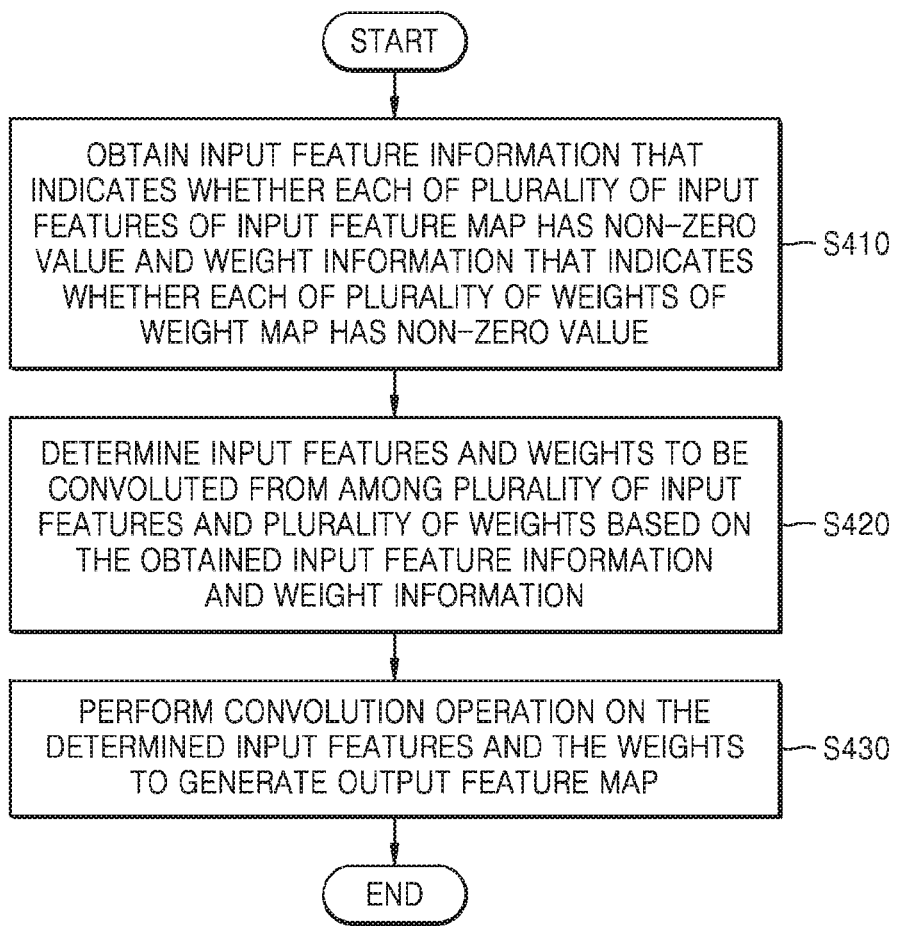
FIG. 4 is a flowchart of a method of operating a neural network processor, according to an embodiment.

FIG. 4 is a flowchart of a method of operating the neural network processor 100, according to an embodiment.

The method shown in FIG. 4 is performed by the structural elements of the neural network processor 100 of FIG. 2, and repeated descriptions thereof will not be given herein.

In operation S410, the neural network processor 100 receives input feature information that indicates whether each of a plurality of input features of an input feature map has a non-zero value and weight information that indicates whether each of a plurality of weights of a weight map has a non-zero value. According to an embodiment, the neural network processor 100 receives input feature information and weight information from an external source, such as a controller. Furthermore, according to another embodiment, the neural network processor 100 generates input feature information from the input feature map and generates weight information from the weight map.

In operation S420, the neural network processor 100 determines input features and weights to be convoluted from among the input features and the weights based on the input feature information and the weight information obtained. According to an embodiment, the neural network processor 100 performs an operation on the input feature information and weight information to detect input features and weights having non-zero values and determines the detected input features and weights as input features and weights to be convoluted.

In operation S430, the neural network processor 100 performs or executes a convolution on the determined input features and the determined weights to generate an output feature map. In other words, the neural network processor 100 selectively convolutes the determined input features and the determined weights, from among the input features of the input feature map and the weights of the weight map. For instance, the neural network processor 100 selectively performs or executes convolution operations only on input features and weights having equal or same non-zero values at locations that correspond to each other from among the input features and the weights. In addition, the neural network processor 100 convolutes input features and weights to generate output feature values. Thus, the neural network processor 100 performs or executes an optional convolution on the input feature map and the weight map based on the input features and the weights having equally non-zero values at locations that correspond to each other to generate an output feature map.

Figure 5:
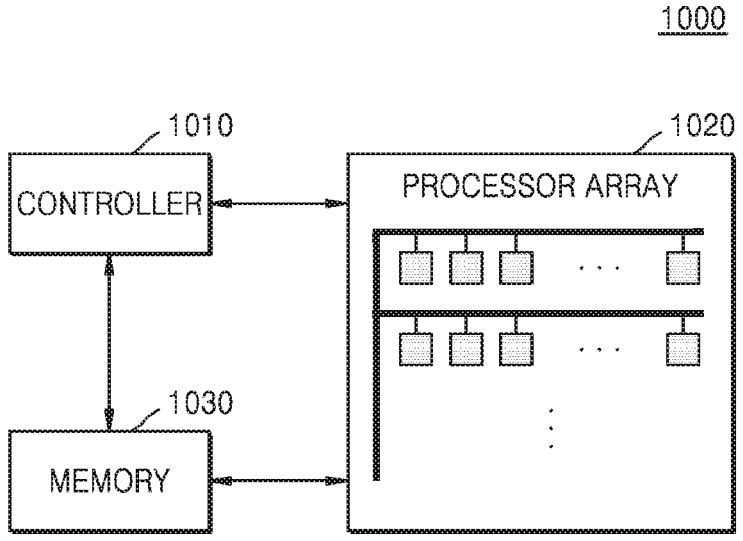
FIG. 5 is a view of a neural network apparatus, according to an embodiment.

FIG. 5 is a view of a neural network apparatus 1000, in accordance with an embodiment.

The neural network apparatus 1000 includes a controller 1010, a processor array 1020, and a memory 1030. The components 1010, 1020, and 1030 of the neural network apparatus 1000 communicate with one another via a system bus. In an embodiment, the neural network apparatus 1000 is implemented as a single semiconductor chip, for example, as a system-on-chip (SoC). However, the present disclosure is not limited thereto and the neural network apparatus 1000 may be implemented as a plurality of semiconductor chips.

The controller 1010 may be implemented as a CPU, a microprocessor, or the like, and may control all operations of the neural network apparatus 1000. The controller 1010 may control operations of the processor array 1020 and the memory 1030. For example, the controller 1010 sets and manages parameters such that the processor array 1020 can operate layers of a neural network normally. Also, according to an embodiment, the controller 1010 includes a rectifier linear unit (ReLU) module.

The processor array 1020 includes a plurality of neural network processors. In addition, the processor array 1020 may be implemented with a plurality of neural network processors in the form of arrays. According to an embodiment, each of the plurality of neural network processors included in the processor array 1020 may be the neural network processor 100 of FIGS. 2 and 3. Also, the plurality of neural network processors may be implemented to operate in parallel, simultaneously. In an embodiment, each of the plurality of neural network processors may operate independently. For example, each of the neural network processors may be implemented as a core circuit cable of executing instructions.

The memory 1030 may be implemented as random access memory (RAM), for example, dynamic RAM (DRAM), SRAM, or the like. The memory 1030 stores various programs and data. According to an embodiment, the memory 1030 stores weight maps or input feature maps provided from an external apparatus, such as a server or external memory.

The controller 1010 allocates an input feature map and a weight map stored in the memory 1030 to the processor array 1020.

In addition, the controller 1010 may generate, from the input feature map, input feature information that indicates whether each of a plurality of input features of the input feature map has a non-zero value. Furthermore, the controller 1010 may generate, from the weight map, weight information that indicates whether each of a plurality of weights of the weight map has a non-zero value. Also, the controller 1010 provides or outputs the input feature information and the weight information to the processor array 1020. Furthermore, according to another embodiment, the controller 1010 receives input feature information and weight information from an external source, such as another controller.

Each of the neural network processors of the processor array 1020 convolutes the allocated input feature map and weight map to generate an output feature map. In addition, the processor array 1020 convolutes on the input feature map and the weight map based on the input feature information and the weight information to generate an output feature map. For instance, the processor array 1020 selectively convolutes input features and weights having non-zero values to generate an output feature map.

The controller 1010 divides the input feature map according to a spatial dimension. For example, the controller 1010 divides the input feature map based on a size of the weight map. The controller 1010 then allocates the divided input feature maps to the processor array 1020.

The controller 1010 groups the plurality of neural network processors of the processor array 1020 into a plurality of processor groups. In other words, the controller 1010 groups a predetermined number of neural network processors into one processor group, and consequently determines a plurality of processor groups. For example, if there are 100 neural network processors, the controller 1010 groups ten (10) neural network processors into one processor group and consequently determines ten (10) processor groups.

The controller 1010 allocates each of the divided input feature maps to each of the processor groups of the processor array 1020. In addition, the controller 1010 allocates a plurality of weight maps to each of the processor groups of the processor array 1020. Accordingly, each of the neural network processors included in the processor groups of the processor array 1020 receives an identical input feature map and different weight maps.

According to an example embodiment, the memory 1030 buffers weight maps corresponding to layers to be executed by the processor array 1020. When an operation is performed using the weight maps in the processor array 1020, the used weight maps are output from an external memory and stored in an internal memory of a neural network processor of the processor array 1020. The memory 1030 temporarily stores the weight maps that are output from the external memory before the weight maps are provided to the internal memory of the neural network processor of the processor array 1020. Furthermore, according to an embodiment, the memory 1030 temporarily stores the output feature map output from the processor array 1020.

According to an embodiment, the controller 1010 groups a plurality of weight maps into a plurality of weight groups based on ratios of weights having non-zero values in the weight maps. In more detail, the controller 1010 groups a plurality of weight maps into a plurality of weight groups such that ratios of weights having non-zero values of weight maps included in a weight group are similar to each other. For example, the controller 1010 aligns a plurality of weight maps in an ascending order based on ratios of weights having a non-zero value from among all weights of a weight map. Further, the controller 1010 groups the aligned weight maps in order in units of a predetermined number to determine a plurality of weight groups. According to an embodiment, the controller 1010 groups a plurality of weight maps into a plurality of weight map groups, based on the number of neural network processors included in one processor group of the processor array 1020. For example, if the number of weight maps is 381 and the number of neural network processors included in one processor group of the processor array 1020 is forty (40), the controller 1010 may group the plurality of weight maps into 10 groups. In other words, the controller 1010 determines nine (9) weight map groups including forty (40) weight maps and one weight map group including 21 weight maps.

The controller 1010 allocates a plurality of weight groups to the processor array 1020. For instance, the controller 1010 sequentially allocates each of a plurality of weight groups to each of the processor groups of the processor array 1020. The controller 1010 allocates weight maps included in a zeroth weight group of the plurality of weight groups to each of the processor groups of the processor array 1020. After a convolution by the processor array 1020 is completed for the zeroth weight group, the controller 1010 allocates weight maps included in a first weight group from among the weight groups to each of the processor groups of the processor array 1020.

Thus, according to an embodiment, the neural network apparatus 1000 sequentially allocates each of the weight groups, which are grouped based on ratios of weights having non-zero values, to the processor array 1020 to improve speed of the convolution of the processor array 120 1020. In other words, because ratios of weights having non-zero values of the weight maps allocated to each processor group of the processor array 1020 are similar to each other, speeds of convolution among the neural network processors in the processor group may be similar to each other. As a result, speed of the arithmetic operation of the array 1020 is improved.

Figure 6:
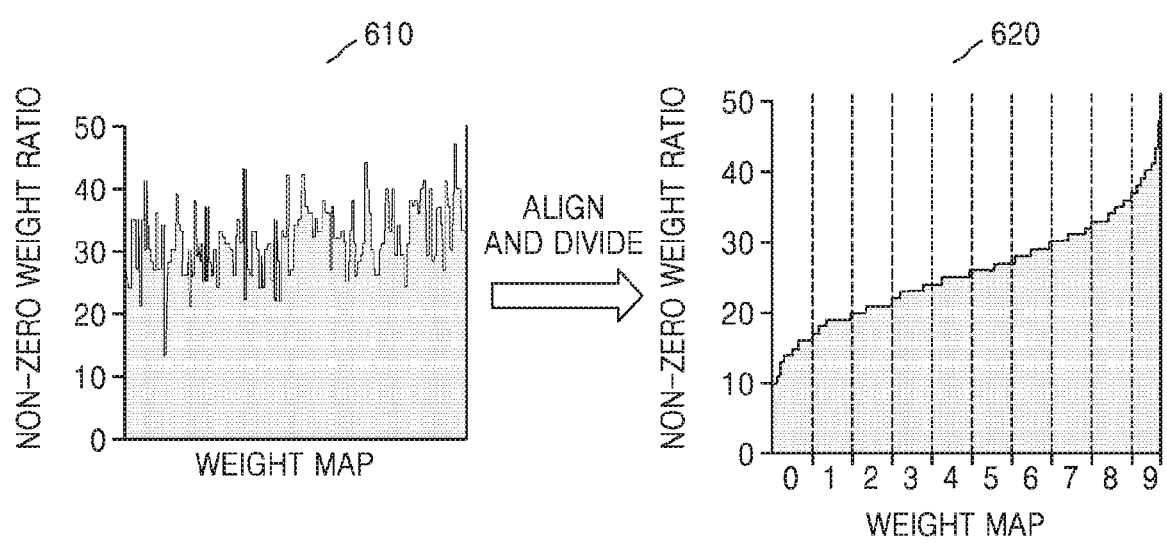
FIG. 6 is a view of an embodiment in which a neural network apparatus groups weight maps into weight groups.

FIG. 6 is a view of an embodiment in which a neural network apparatus groups a plurality of weight maps into a plurality of weight groups.

According to an embodiment, a graph 610 shows a non-zero weight ratio for each of weight maps stored in the memory 1030. The controller 1010 detects the non-zero weight ratio for each of the weight maps stored in the memory 1030 as shown in the graph 610 and aligns the weight maps, as shown in a graph 620, based on the non-zero weight ratio. The graph 620 shows that the weight maps are aligned in an ascending order based on the non-zero weight ratio. The controller 1010 groups the aligned weight maps into a plurality of weight map groups. For example, the controller 1010 groups the aligned weight maps in order in units of a predetermined number to determine 10 weight map groups, as shown in the graph 620. In other words, the controller 1010 determines weight map groups 0 to 9. Accordingly, non-zero weight ratios for weight maps included in each of the 10 weight map groups may be similar to each other.

Figure 7A:
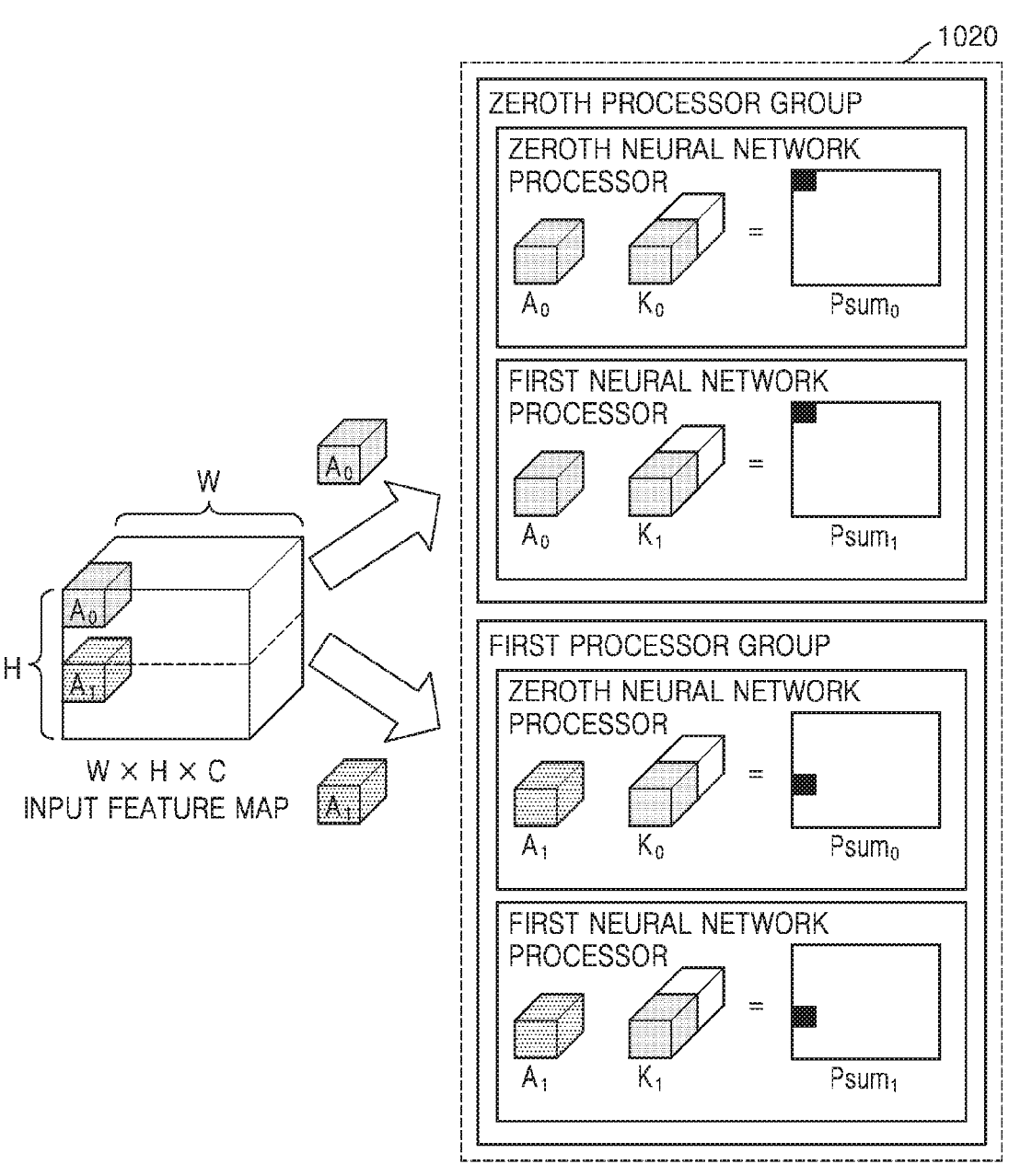
FIGS. 7A and 7B are views of embodiments in which a neural network apparatus processes an input feature map and a weight map.
Figure 7B:
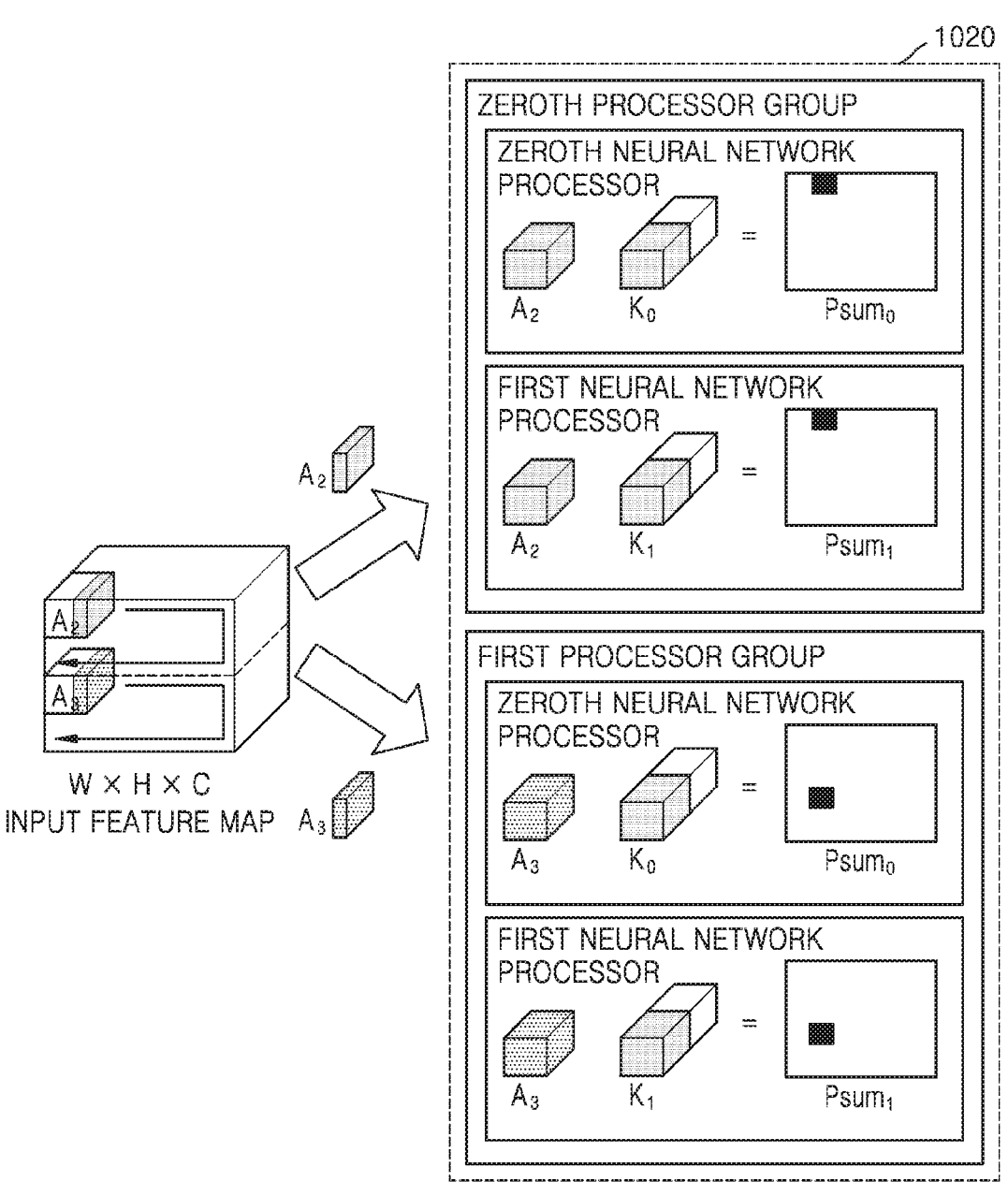

FIGS. 7A and 7B are views of embodiments in which a neural network apparatus processes an input feature map and a weight map.

The controller 1010 divides an input feature map with a width W, a height H, and a channel C according to a spatial dimension and sequentially allocates the divided input feature maps to each of the processor groups of the processor array 1020. According to an embodiment, referring to arrows of FIG. 7B, the controller 1010 allocates the divided input feature maps to each of the processor groups in the processor array 1020 in a zig-zag direction.

Referring to FIG. 7A, the controller 1010 allocates each of the divided input feature maps $A_0$ and $A_1$ to each of a zeroth processor group and a first processor group of the processor array 1020.

In addition, the controller 1010 sequentially allocates a plurality of weight maps to each of the processor groups of the processor array 1020. For example, the controller 1010 allocates weight maps $K_0$ and $K_1$ of a zeroth weight group to each of the zeroth processor group and the first processor group of the processor array 1020. The controller 1010 also allocates a first weight group to the processor array 1020 in response to the processor array 1020 completing a convolution on all input feature maps with the zeroth weight group.

Processor groups of the processor array 1020 convolutes allocated input feature maps and weight maps to generate an output feature map. For example, a zeroth neural network processor of the zeroth processor group convolutes the input feature map $A_0$ and the weight map $K_0$ to generate an output feature map $Psum_0$. In other words, the zeroth neural network processor generates the output feature map $Psum_0$ for the input feature map $A_0$ corresponding to a part of the entire input feature map. In addition, a first neural network processor of the zeroth processor group convolutes the input feature map $A_0$ and the weight map $K_1$ to generate an output feature map $Psum_1$. Similarly, the zeroth neural network processor of the first processor group convolutes the input feature map $A_1$ and the weight map $K_0$ to generate the output feature map $Psum_0$. The first neural network processor of the first processor group convolutes the input feature map $A_1$ and the weight map $K_1$ to generate the output feature map $Psum_1$.

Referring to FIG. 7B, the controller 1010 allocates each of the divided input feature maps $A_2$ and $A_3$ to each of the zeroth processor group and the first processor group of the processor array 1020 after the convolution on the divided input feature maps $A_0$ and $A_1$. Then, the zeroth processor group of the processor array 1020 convolutes pre-allocated weight maps $K_0$ and $K_1$ and the input feature map $A_2$ to generate the output feature maps $Psum_0$ and $Psum_1$. Furthermore, the first processor group of the processor array 1020 convolutes the pre-allocated weight maps $K_0$ and $K_1$ and the input feature map $A_3$ to generate the output feature maps $Psum_0$ and $Psum_1$.

Figure 8:
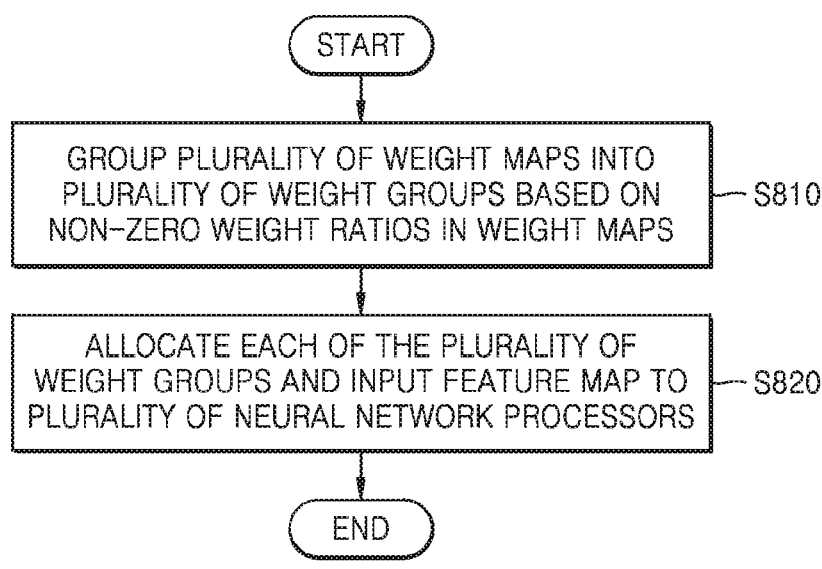
FIG. 8 is a flowchart of a method of operating a neural network apparatus, according to an embodiment.

FIG. 8 is a flowchart of a method of operating the neural network apparatus 1000, according to an embodiment.

The method shown in FIG. 8 is performed by each component of the neural network apparatus 1000 of FIG. 5, and repeated descriptions thereof will not be given herein.

In operation S810, the neural network apparatus 1000 groups a plurality of weight maps into a plurality of weight groups based on non-zero weight ratios in the weight maps. For instance, the neural network apparatus 1000 groups a plurality of weight maps into a plurality of weight groups such that ratios of weights having non-zero values of weight maps included in a weight group are similar to each other.

Furthermore, the neural network apparatus 1000 groups a plurality of neural network processors into a plurality of processor groups. In other words, the neural network apparatus 1000 groups a predetermined number of neural network processors into one processor group and, consequently, determines a plurality of processor groups.

In operation S820, the neural network apparatus 1000 allocates each of the weight groups and an input feature map to the neural network processors. For example, the neural network apparatus 1000 sequentially allocates each of the weight groups to the processor groups.

Thus, each of the processor groups convolute the allocated weight groups and the input feature map to generate an output feature map.

Figure 9:
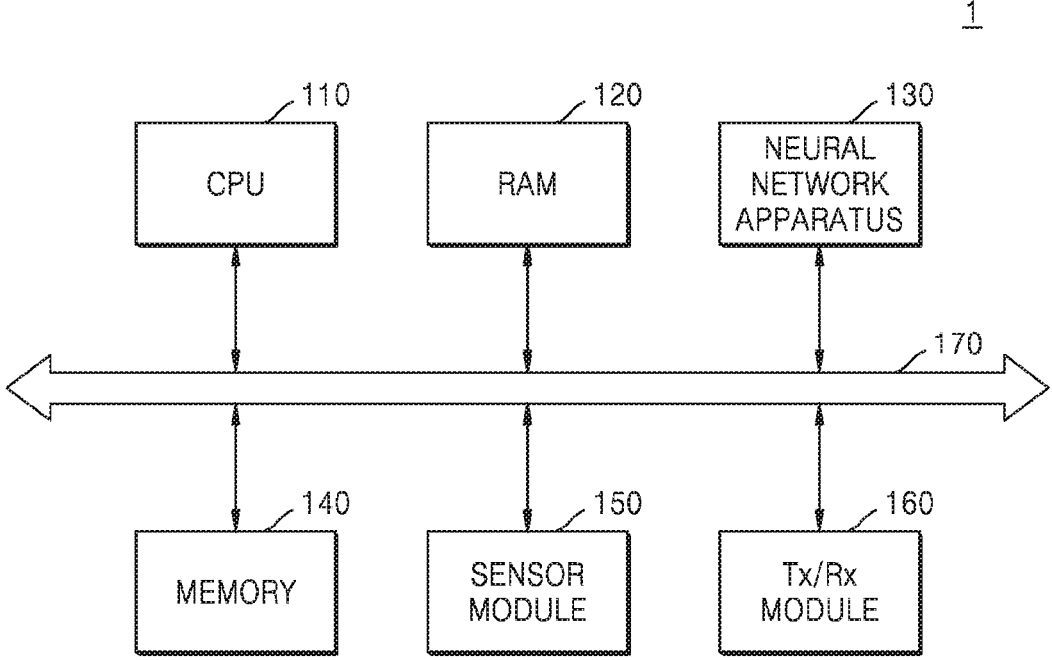
FIG. 9 is a block diagram of an electronic system, according to an embodiment.

FIG. 9 is a block diagram of an electronic system 1, according to an embodiment.

The electronic system 1 according to an example embodiment of the inventive concept may analyze input data based on a neural network in real time to extract valid information, determine a situation based on the extracted information, or control configurations of an electronic apparatus on which the electronic system 1 is mounted. For example, the electronic system 1 may be a robotic apparatus such as a drone, an Advanced Drivers Assistance System (ADAS), a smart TV, a smart phone, a medical apparatus, a mobile apparatus, an image display apparatus, an Internet of Things (IoT) apparatus, and the like, and may be mounted on one of various kinds of electronic apparatuses.

Referring to FIG. 9, the electronic system 1 includes a CPU 110, RAM 120, a neural network apparatus 130, a memory 140, a sensor module 150, and a communication module 160. The electronic system 1 may further include an input/output module, a security module, and a power control apparatus. In an embodiment, some of the hardware components of the electronic system 1 (the CPU 110, the RAM 120, the neural network apparatus 130, the memory 140, the sensor module 150, and the communication module 160) may be mounted on a semiconductor chip. In addition, the neural network apparatus 130 may correspond to the neural network apparatus 1000 of FIG. 5.

The CPU 110 controls general operations of the electronic system 1. The CPU 110 includes a processor core or a plurality of processor cores (multi-core). The CPU 110 processes or executes programs and/or data stored in the memory 140. In an embodiment, the CPU 110 controls functions of the neural network apparatus 130 by executing programs stored in the memory 140.

The RAM 120 temporarily stores programs, data, or instructions. For example, the programs and/or data stored in the memory 140 are temporarily stored in the RAM 120 according to a control of the CPU 110 or boot code. The RAM 120 may be implemented as a memory such as DRAM or SRAM.

The neural network apparatus 130 convolutes a neural network based on received input data, and generates an information signal based on the result of the convolution. The neural network includes, but is not limited to, Convolutional Neural Networks (CNN), Recurrent Neural Networks (RNN), Deep Belief Networks, and Restricted Boltzmann Machines.

The information signal includes one of various kinds of recognition signals such as an audio recognition signal, an object recognition signal, an image recognition signal, and a biometric information recognition signal. For example, the neural network apparatus 130 receives frame data included in a video stream as input data, and generates a recognition signal for an object included in an image represented by the frame data from the frame data. However, the neural network apparatus 130 is not limited thereto and receives various kinds of input data and generates recognition signals according to the input data depending on a type or a function of the electronic apparatus on which the electronic system 1 is mounted.

The memory 140 is a storage area to store data, and stores an Operating System (OS), various programs, and various data. In an embodiment, the memory 140 stores intermediate results generated during the convolution performed by the neural network apparatus 130, for example, output feature maps, as an output feature list or an output feature matrix. In an example embodiment, the memory 140 stores a compressed output feature map. The memory 140 also stores various parameters used in the neural network apparatus 130, such as a weight map or a weight list.

The memory 140 may be DRAM, but is not limited thereto. The memory 140 may include at least one of volatile memory and nonvolatile memory. The nonvolatile memory may include read only memory (ROM), programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), or ferroelectric RAM (FRAM). The volatile memory may include DRAM, SRAM, synchronous DRAM (SDRAM), PRAM, MRAM, RRAM, or FRAM. In an example embodiment, the memory 140 may include at least one of a hard disk drive (HDD), a solid state drive (SSD), compact flash (CF), secure digital (SD), micro secure digital (Micro-SD), mini secure digital (Mini-SD), extreme digital (xD), or a memory stick.

The sensor module 150 collects information around the electronic apparatus on which the electronic system 1 is mounted. The sensor module 150 senses or receives a signal (e.g., a video signal, an audio signal, a magnetic signal, a biological signal, a touch signal, etc.) from a source that is external to the electronic apparatus, and may convert the sensed or received signal into data. To do so, the sensor module 150 may include at least one of various types of sensing apparatuses such as a microphone, an imaging apparatus, an image sensor, a light detection and ranging (LIDAR) sensor, an ultrasonic sensor, an infrared sensor, and a biosensor.

The sensor module 150 may provide the converted data to the neural network apparatus 130 as input data. For example, the sensor module 150 may include an image sensor, which may capture an external environment of the electronic apparatus to produce a video stream, and sequentially transmits successive data frames of the video stream to the neural network apparatus 130 as input data. However, the sensor module 150 is not limited thereto and may provide various kinds of data to the neural network apparatus 130.

The communication module 160 may have various wired or wireless interfaces capable of communicating with external apparatuses. For example, the communication module 160 may be a wired local area network (LAN), a wireless local area network (WLAN) such as Wireless Fidelity (Wi-fi), a wireless personal communication network (WPAN) such as Bluetooth, a wireless Universal Serial Bus (USB), ZigBee, Near Field Communication (NFC), Radio Frequency Identification (RFID), Power Line Communication (PLC), or a communication interface that can be connected to a mobile cellular network such as 3G (3rd Generation), 4G (4th Generation), or Long Term Evolution (LTE).

In an embodiment, the communication module 160 receives a weight map from an external server. The external server trains weights based on a large amount of learning data and provides a weight map including the trained weights to the electronic system 1. The received weight map may be stored in a memory 140.

According to the present embodiments, a neural network processor selectively convolutes input features and weights having non-zero values to reduce an amount of operations and operation time in a convolution operation on input features and weights.

In addition, according to the present embodiments, a neural network apparatus sequentially allocates each of a plurality of weight groups grouped based on a ratio of the weights having non-zero values to a processor array to improve the speed of a convolution performed by the processor array.

The neural network processor 100, the fetch controller 112, the data arithmetic circuit 114, the controller 1010, the memory 140, the memory 1030, the processor array 1020, the sensor module 150, and the Tx/Rx module 160 in FIG. 2, FIG. 5, and FIG. 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4 and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A neural network processor, comprising:
one or more first processors;

an array of second processors configured to be executed in parallel with respect to each other, wherein the one or more first processors are not included in the array of second processors;

a memory storing instructions configured to cause the one or more first processors to control operations of the second processors, the control including:

dividing the second processors into processor groups, wherein each processor group has at least two of the second processors, and wherein each second processor is in only one processor group;

based on a received input feature map, spatially dividing the input feature map into feature map parts;

based on received weight maps of a convolutional neural network (CNN), determining non-zero ratios of the respective weight maps, wherein each weight map has a respectively determined non-zero ratio, and wherein each non-zero ratio is a ratio of non-zero weights in the corresponding weight map;

sorting the weight maps into an ordering of increasing order of the non-zero ratios thereof;

segmenting the ordering of the weight maps to form weight map groups, wherein each weight map group consists of weight maps whose non-zero ratios are higher than those of its preceding weight map group;

according to spatial ordering of the feature map parts in the feature map, allocating the feature map parts to the respective processor groups, wherein each second processor in a processor group processes the feature map part allocated to its processor group;

allocating the weight maps to the second processors according to the increasing non-zero ratio ordering of the weight maps; and performing, by the second processors, convolution operations between the weight maps allocated thereto and the feature map parts allocated thereto.

2. The neural network processor of claim 1, wherein the convolution operations are based on an input feature vector and a weight feature vector, wherein the input feature vector and the weight vector are determined based on a collective consideration of both the input feature map and the weight maps.

3. The neural network processor of claim 2, wherein the input feature vector indicates zero-valued features of the feature map with zeros and indicates non-zero-valued features of the feature map with ones, and the weight vector indicates zero-valued weights of the weight maps by zeroes and indicates non-zero-valued weights with ones.

4. A method of operating a neural network processor, the neural network processor comprising one or more first processors and an array of second processors that do not include the first processors, the method, performed by the one or more first processors, comprising:

dividing the second processors into processor groups, wherein each processor group has at least two of the second processors, and wherein each second processor is in only one processor group;

based on a received input feature map, spatially dividing the input feature map into feature map parts, the spatially dividing corresponding to a spatial order of convolution processing of the input feature map;

based on received weight maps of a convolutional neural network (CNN), determining non-zero ratios of the respective weight maps, wherein each weight map has a respectively determined non-zero ratio;

sorting the weight maps into an ordering of increasing non-zero ratios thereof; segmenting the ordering of the weight maps to form weight map groups, wherein each weight map group, consists of weight maps whose non-zero ratios are higher than those of its preceding weight map group;

according to the spatial order of convolution processing of the feature map parts in the feature map, allocating the feature map parts to the respective processor groups, wherein each second processor in a processor group convolves the same feature map part that is allocated to its processor group;

allocating the weight maps to the second processors according to the increasing non-zero ratio ordering of the weight maps; and performing, by the second processors, convolution operations between the weight maps allocated thereto and the feature map parts allocated thereto.

5. The method of claim 4, wherein, the convolution operations are based on a comparison of input features of the feature map and weights of the weight maps, wherein convolution of zero weights or zero features are prevented, and the input features and the weights are spatially corresponding with respect to the convolution operations.

6. The method of claim 5, wherein the convolution operations are controlled by logical ANDing between the input features and the weights.

7. A non-transitory computer-readable storage medium storing instructions that, when executed by a processor, cause the processor to perform the method of claim 4.

8. A neural network apparatus, comprising:

a processor array comprising second processors;

a memory configured to store an input feature map and weight maps; and one or more first processors configured, according to instructions executable thereby, to:

divide the second processors into processor groups, wherein each processor group has at least two of the second processors, and wherein each second processor is in only one processor group;

based on an input feature map, spatially divide the input feature map into feature map parts;

based on received weight maps, determine non-zero weight ratios of the respective weight maps and determine an ordering of the weight maps such that their respectively corresponding non-zero weight ratios are in increasing order in the ordering;

allocate the weight maps to the second processors based on the ordering of the weight maps;

allocate the feature map parts to the processor groups, respectively, based on spatial correspondences thereof with the weight maps; and perform, by each second processor, convolution operations between the corresponding allocated weight maps and feature maps to generate an output feature map.

9. The neural network apparatus of claim 8, wherein the ordering of the weight maps is segmented to form groups of the weight maps, and the groups of the weight maps are allocated to the processor groups, respectively.

10. The neural network apparatus of claim 8, wherein the one or more first processors are further configured to:

provide input feature information that indicates non-zero input features of the input feature map weight information that indicates non-zero weights of the weight maps, and wherein the processor array is further configured to convolve the input feature map and the weight maps, as allocated to the second processors, based on the input feature information and the weight information to generate the output feature map.

11. The neural network apparatus of claim 8, wherein the input feature map is divided into the input feature map parts based on a geometry of the weight maps.

12. The neural network apparatus of claim 9, wherein the weight maps are divided into the groups of the weight maps based on the number of second processors.

13. The neural network apparatus of claim 9, wherein the allocating a weight group, among the groups of weights, to a processor group comprises:

allocating each weight map in the weight group to a respectively corresponding second processor in the processor group, such that each second processor in the weight group convolves the same feature map part with its corresponding feature map part.

14. The neural network apparatus of claim 8, wherein each second processor within a processor group receives a different weight map in a same group of weight maps, such that each second processor in the processor group convolves a different weight map of the processor group with a same feature map part.

* * * * *